US006886880B2

United States Patent
Heselhaus

(10) Patent No.: US 6,886,880 B2
(45) Date of Patent: May 3, 2005

(54) FOLDABLE TOPS FOR CONVERTIBLE VEHICLES

(75) Inventor: Udo Heselhaus, Ibbenbueren (DE)

(73) Assignee: Wilhelm Karmann GmbH, Osnabrueck (DE)

( * ) Notice: Subject to any disclaimer, the term of this patent is extended or adjusted under 35 U.S.C. 154(b) by 0 days.

(21) Appl. No.: 10/658,646

(22) Filed: Sep. 9, 2003

(65) Prior Publication Data

US 2004/0046415 A1 Mar. 11, 2004

(30) Foreign Application Priority Data

Sep. 11, 2002 (DE) .......................................... 102 42 045

(51) Int. Cl.⁷ ................................................ B60J 1/14
(52) U.S. Cl. ............................ 296/107.07; 296/107.12; 296/146.14
(58) Field of Search ....................... 296/107.12, 107.07, 296/107.04, 146.14

(56) References Cited

U.S. PATENT DOCUMENTS

| 2,711,924 A | * | 6/1955 | Hewitt ................... 296/107.12 |
| 4,778,215 A | | 10/1988 | Ramaciotti |
| 5,267,771 A | * | 12/1993 | Rothe ......................... 296/121 |
| 5,816,644 A | | 10/1998 | Rothe et al. |
| 6,302,470 B1 | | 10/2001 | Maass et al. |
| 2002/0024230 A1 | | 2/2002 | Pfertner et al. |
| 2002/0074822 A1 | | 6/2002 | Rothe et al. |

FOREIGN PATENT DOCUMENTS

EP                1 024 042 A2    8/2000

* cited by examiner

Primary Examiner—Joseph D. Pape
(74) Attorney, Agent, or Firm—Michael Best & Friedrich LLP

(57) ABSTRACT

Convertible vehicles (1) may include a vehicle body (6) defining a window shoulder line (5) along its upper edge. A foldable roof (2) preferably includes a rear window (4) disposed within a rear roof portion (3) and the foldable roof can be stored substantially completely within the vehicle body and below the window shoulder line. First and second tensioning bow portions (16a) extend substantially laterally with respect to the rear window and substantially in parallel with a central longitudinal axis of the vehicle. A first end of each tensioning bow portion may be pivotably coupled to the vehicle body and a second end of each tensioning bow portion may be pivotably coupled to the rear window. A gap or space is preferably between the tensioning bow portions proximal to the window shoulder line. At least a portion of the rear window optionally may extend within the gap or space when the roof is disposed in the roof closed position. A flexible water channel (22) preferably couples the vehicle body to the foldable roof.

32 Claims, 7 Drawing Sheets

FOLDABLE TOPS FOR CONVERTIBLE VEHICLES

CROSS-REFERENCE

This application claims priority to German patent application serial number 102 42 045.9 filed Sep. 11, 2002, the contents of which are incorporated herein by reference.

1. Technical Field

The invention relates to foldable tops suitable for use in convertible vehicles.

2. Description of the Related Art

U.S. Patent Publication No. 2002-24230 discloses a convertible vehicle with a rear window which, to open the roof, can be retracted in a downward movement below a window shoulder line of the vehicle body and can be stored in a convertible top (roof) storage compartment. In order to store the rear window within the roof storage compartment in a compact manner, the rear window is freed or detached from a surrounding flexible roof portion when the roof is opened and is then refitted into the surrounding flexible roof portion when the roof is closed. Thus, this design requires a large sealing and mechanical force or effort to press the rear window against a roof seal when the roof is closed, which also increases the weight of the construction. Moreover, the rear window must have a relatively narrow breadth (width), so that the rear window will fit within the roof storage compartment when the roof is opened.

SUMMARY OF THE INVENTION

It is, accordingly, one object of the present teachings to provide improved foldable tops suitable for convertible vehicles and to provide methods for making and using the same.

In one aspect of the present teachings, convertible vehicles are taught that include a rear window having a relatively large transparent (visible) area while still providing a roof that can be moved from a roof open position to a roof closed position with relatively little effort.

In another aspect of the present teachings, the transparent (visible) area of the rear window may extend to approximately the bottom of the foldable top, due to the removal of a portion of a tensioning bow that is normally disposed below the rear window. In fact, the transparent area of the rear window may optionally constitute at least a part of the lower edge of the foldable top. In addition or in the alternative, the transparent (visible) area of the rear window preferably extends below the window shoulder line of the vehicle when the roof is disposed in the roof closed position. In other words, the rear window may extend down to a rear trunk lid, so as to provide an unobstructed view down to the vehicle body. Thus, in this aspect, the visible area provided by the rear window is not restricted by such a middle tensioning bow portion, thereby enabling the size of the transparent area to be significantly increased as compared to known designs. In addition, the weight of the foldable top can be reduced by limiting the tensioning bow (tensioning bow portions or bars) to only the lateral side sections or portions of the foldable top.

In another aspect of the present teachings, a flexible water channel may movably couple the vehicle body to the foldable roof (e.g., to the tensioning bow(s) and the rear window). The water channel preferably serves as a seal or barrier against water entering into the vehicle body throughout the entire range of movement of the foldable top and the water channel. Because no additional pressure is required to maintain such a water seal or barrier, the roof can be closed using a relatively small mechanical force as compared with the above-described known design. This embodiment is particularly advantageous when utilized with the above-noted tensioning bow that does not include a central portion.

In another aspect of the present teachings, the foldable roof may be directly, or substantially directly, coupled (attached) to the vehicle body, which direct attachment serves to seal the vehicle body against water entry. For example, as noted above, the flexible water channel may be utilized to connect the foldable roof to the vehicle body. In such case, a frame or similar construction is not required to hold the rear window in manner that will guarantee a tight seal. Therefore, the size of the rear window can, e.g., be enlarged, as compared to commonly-used rear window designs for convertible vehicles. For example, the lateral sides (i.e., the left and right sides) of rear window optionally may extend at least partially around to the lateral side portions of the roof (and the vehicle), thereby providing a relatively large, transparent surface having a high light incidence. Also, no material enclosure need be provided along the lower edge of the rear window, and the rear window can be lowered down to below the window shoulder line in order to store the foldable roof.

It is further advantageous, especially in combination with the above-noted aspects of the present teachings, to horizontally extend the water channel around the rear roof border (edge) in substantially a U-shape. In other words, when a horizontal cross-section of the water channel is viewed from above or below, the water channel preferably has a substantially U-shape. In addition, each laterally disposed portion (i.e., the portion(s) disposed substantially parallel to the vehicle longitudinal axis and outside the range or breadth of the rear window) of the water channel may preferably be coupled to the respective tensioning bow portion. The middle (central) portion (i.e., the portion(s) disposed substantially perpendicular to the vehicle longitudinal axis, which vehicle longitudinal axis extends through the rear window) of the water channel may be coupled, directly or indirectly, to the rear window. According to such a design, the required sealing force or effort can be reduced to a minimum. Further, the rear window and lateral tensioning bow portions can be treated in the same manner for the purpose of sealing, which results in a high degree of design freedom when selecting the desired breadth or width of the rear window.

The water channel optionally may be formed as a one-piece (integral) construction, such as a flexible synthetic polymer material construction made of, e.g., a flexible fabric based upon a polyamide that is coated with polyurethane. Both weight and manufacturing costs can be reduced according to such an embodiment.

Additional objects, features and advantages of the present teachings will be readily understood to a person of ordinary skill in the art after reading the following detailed description of examples and embodiments of the present teachings together with the claims and the accompanying drawings.

DETAILED DESCRIPTION OF THE INVENTION

Figure 1:
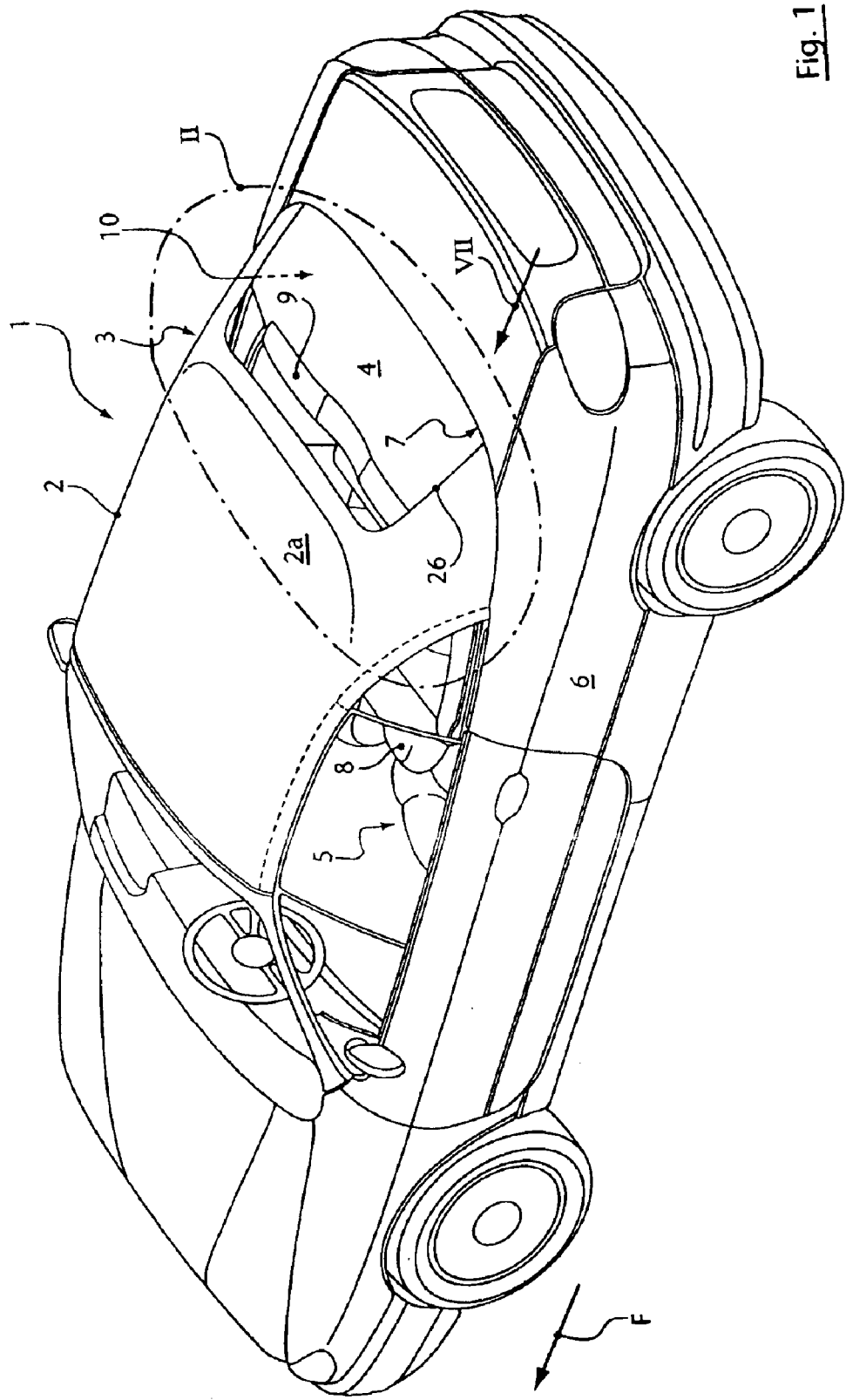
FIG. 1 shows a perspective overview of a representative convertible vehicle and a representative foldable roof according to the present teachings, as viewed from a rear angle with a closed roof.

In one embodiment of the present teachings, convertible vehicles may preferably include a vehicle body defining a window shoulder line along an upper edge of the vehicle body. A foldable roof preferably includes a rear window supported within a rear roof portion. The rear window preferably may be configured so as to extend below the window shoulder line when the foldable roof is disposed in the roof closed position, thereby providing a relatively large visible area through the foldable roof. In addition, the foldable roof preferably may be arranged and constructed to be stored substantially completely within the vehicle body and below the window shoulder line when the foldable roof is disposed in a roof closed position. The rear window is preferably coupled, directly or indirectly, to the vehicle body in a manner that provides a seal or barrier against water entering into the vehicle body regardless of the position of the foldable roof.

First and second tensioning bow portions may extend substantially laterally (i.e., on each side) of the rear window and substantially in parallel with a central longitudinal axis of the vehicle. A first end of each tensioning bow portion may be pivotably coupled, directly or indirectly, to a vehicle body. A second end of each tensioning bow portion may be pivotably coupled, directly or indirectly, to the rear window. For example, the second end of each tensioning bow portion preferably may be pivotably coupled to a lowermost portion of the rear window, as defined when the roof is disposed in the roof closed position. A gap or space is preferably defined between the first and second tensioning bow portions. Optionally, the rear window may extend or be disposed at least partially within the gap. In addition, the middle (central) longitudinal axis of the vehicle preferably falls within the defined gap or space. According to such a design, the rear window may be designed so as to extend all the way down to the window shoulder line (or even below the window shoulder line), thereby increasing the visible area provided by the rear window. The first and second tensioning bow portions may be substantially straight and/or may include curved portions so as to conform to the shape of the foldable roof (e.g., corner portions of the foldable roof).

A flexible water channel preferably may movably couple the vehicle body to the foldable roof (e.g., to the rear window and to the first and second tensioning bow portions). In one preferred embodiment, the flexible water channel may include first and second walls and a trough or recess that is defined between the first and second walls. The trough is preferably designed so as to collect water and/or other foreign substances and to direct (dispose of) any such collected water and/or foreign substances away from the vehicle body. In addition or in the alternative, the flexible water channel may serve as a barrier (seal) to prevent water and/or other foreign substances from entering into the vehicle body, regardless of the position of the roof. As noted above, the flexible water channel may be made of a synthetic resin material, or possibly may be a textile material that has been treated so as to repel water. In the latter embodiment, the textile material may be pre-formed so as to define a trough or recess therein. Furthermore, the textile material may optionally be the same material as the roof cover or may be a different textile material.

In an optional embodiment, the first wall of the flexible water channel may be coupled to the vehicle body. A substantially central portion (as defined with respect to the vehicle longitudinal axis) of the second wall may be attached, directly or indirectly, to a lower edge of the rear window and lateral (outer) portions (again, as defined with respect to the vehicle longitudinal axis) of the second wall may respectively be attached, directly or indirectly, to the first and second tensioning bow portions. Moreover, the water channel may be advantageously constructed as an integrally formed component having a substantially U-shape.

In another optional embodiment, a height ratio defined between the first wall and the second wall preferably varies or changes within a range of between about 5:1 and 1:5 according to the opening state of the roof. In other words, the height ratio between the first and second walls changes as the roof is being opened and closed in this embodiment.

In another optional embodiment, the rear window preferably has curved lateral side portions and the lower portion of the rear window extends down to, or even below, the window shoulder line, so as to provide a substantially panoramic rear view for the driver of the vehicle.

In another optional embodiment, a seal or sealing member may be disposed on the vehicle body, preferably near (e.g., just below) the window shoulder line. When the roof is disposed in the roof closed position, a lower portion of the rear window preferably contacts (is pressed against) the seal, so as to prevent water and/or other foreign substances from entering into the vehicle body between the rear window and the vehicle body. When the roof is moved to the roof open position, the lower portion of the rear window preferably separates from the seal so that the roof and rear window can be efficiently (compactly) stored within the vehicle body (e.g., within a roof storage compartment defined within the vehicle body).

In another optional embodiment, the rear window may be substantially rigid (e.g., glass). Further, the foldable roof and vehicle body may be arranged and constructed so to store the rear window within the vehicle body, e.g., within a roof storage compartment that may be defined next to a rear trunk, when the roof is disposed in the roof open position.

Each of the additional features and teachings disclosed below may be utilized separately or in conjunction with other features and teachings to provide improved folding roof tops and convertible vehicles and methods for designing and using such foldable tops and vehicles. Representative examples of the present invention, which examples utilize many of these additional features and teachings both separately and in conjunction, will now be described in further detail with reference to the attached drawings. This detailed description is merely intended to teach a person of skill in the art further details for practicing preferred aspects of the present teachings and is not intended to limit the scope of the invention. Moreover, combinations of features and steps disclosed in the following detail description may not be necessary to practice the invention in the broadest sense, and are instead taught merely to particularly describe representative examples of the invention. Further, various features of the representative examples and the dependent claims may be combined in ways that are not specifically and explicitly enumerated in order to provide additional useful embodiments of the present teachings. All features disclosed in the description and/or the claims are intended to be disclosed separately and independently from each other for the purpose of original written disclosure, as well as for the purpose of restricting the claimed subject matter independent of the compositions of the features in the embodiments and/or the claims. In addition, all value ranges or indications of groups of entities are intended to disclose every possible intermediate value or intermediate entity for the purpose of original written disclosure, as well as for the purpose of restricting the claimed subject matter.

As shown in FIG. 1, convertible vehicle 1 includes a movable or foldable roof (convertible top) 2. A rear roof portion 3, as viewed in the direction of travel F, preferably supports a flexible or a rigid rear window 4, e.g., made of a synthetic polymer material or more preferably glass. A frame optionally may be provided around one or more of the outer edges of the rear window 4. As discussed further below, tensioning bow portions 16a optionally may be pivotably coupled directly to the rear window 4, or to a frame disposed around the rear window 4.

The roof 2 may be entirely or only partially rigid and portions of or the entire roof 2 preferably are lined (covered) with a textile cover 2a. The roof 2 is preferably movable altogether to its opening position and can be partially or entirely stored within the vehicle body 6 below a window shoulder line 5. In this specification, the term "window shoulder line" is intended to mean the substantially horizontally extending border or interface between the upper edge of the vehicle body 6 and the bottommost exposed portions of the side windows of the vehicle 1.

Figure 3:
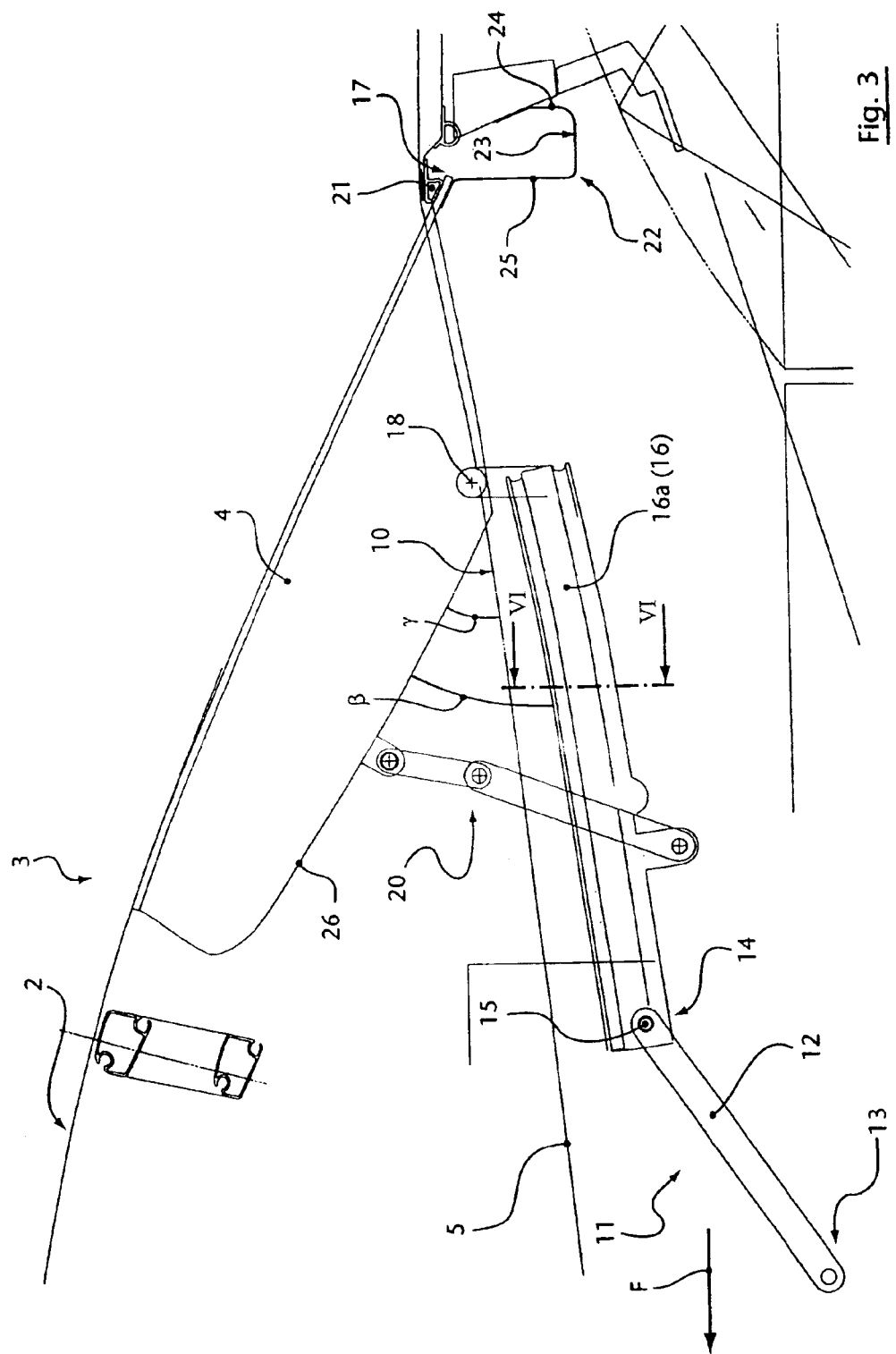
FIG. 3 shows a schematic lateral view of the rear roof portion and its connection to the vehicle body in a closed position.
Figure 4:
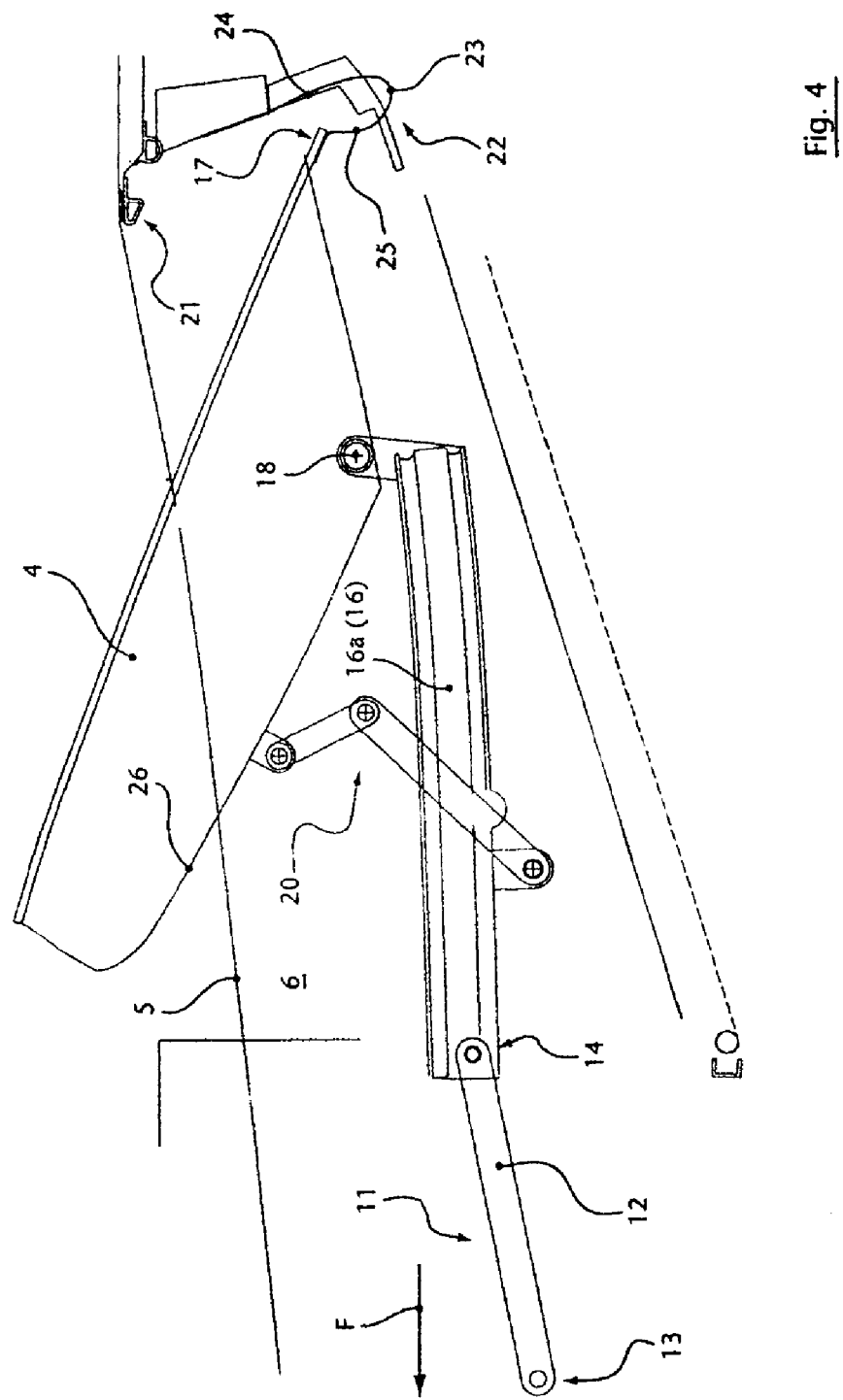
FIG. 4 shows a view similar to FIG. 3 while the roof is being opened, in which the roof rear portion is being lowered below the window shoulder line of the vehicle.

In the representative embodiment shown in the drawings, when disposed in the roof closed state or condition, a lower rear edge 7 of the roof 2 preferably does not rest on a lid for covering the roof 2 in the stored position. Such a lid would first need to be opened in order to lower the roof 2 into a roof storage compartment (not numbered, but depicted in FIGS. 3–5) defined within the vehicle body 6. Rather, according to the present teachings, the roof 2 preferably can directly be lowered or moved into the roof storage compartment. Therefore, it is not necessary to upwardly shift or move the lower rear edge 7 in order to open the roof 2. Instead, at the beginning of the roof opening operation, the lower rear edge 7 can be directly moved below the window shoulder line 5, as shown in FIG. 4.

As shown in FIG. 1, a hat shelf 10 optionally may be provided adjacent to the rear window 4 and is preferably substantially horizontal when the roof 2 is disposed in the closed position. The hat shelf 10 is preferably folded and stored when the roof 2 is opened. For example, the hat shelf 10 may be designed to be movable in one or more blocks as the roof 2 is being opened. In addition or in the alternative, a tarpaulin, a boot or any similar cover may be provided to cover the roof 2 when the roof 2 is stored in the roof storage compartment.

The convertible vehicle 1 may include one or more rows of seats. Therefore, the longitudinal length of the roof 2 is chosen in accordance with the length of the passenger cabin.

Figure 2:
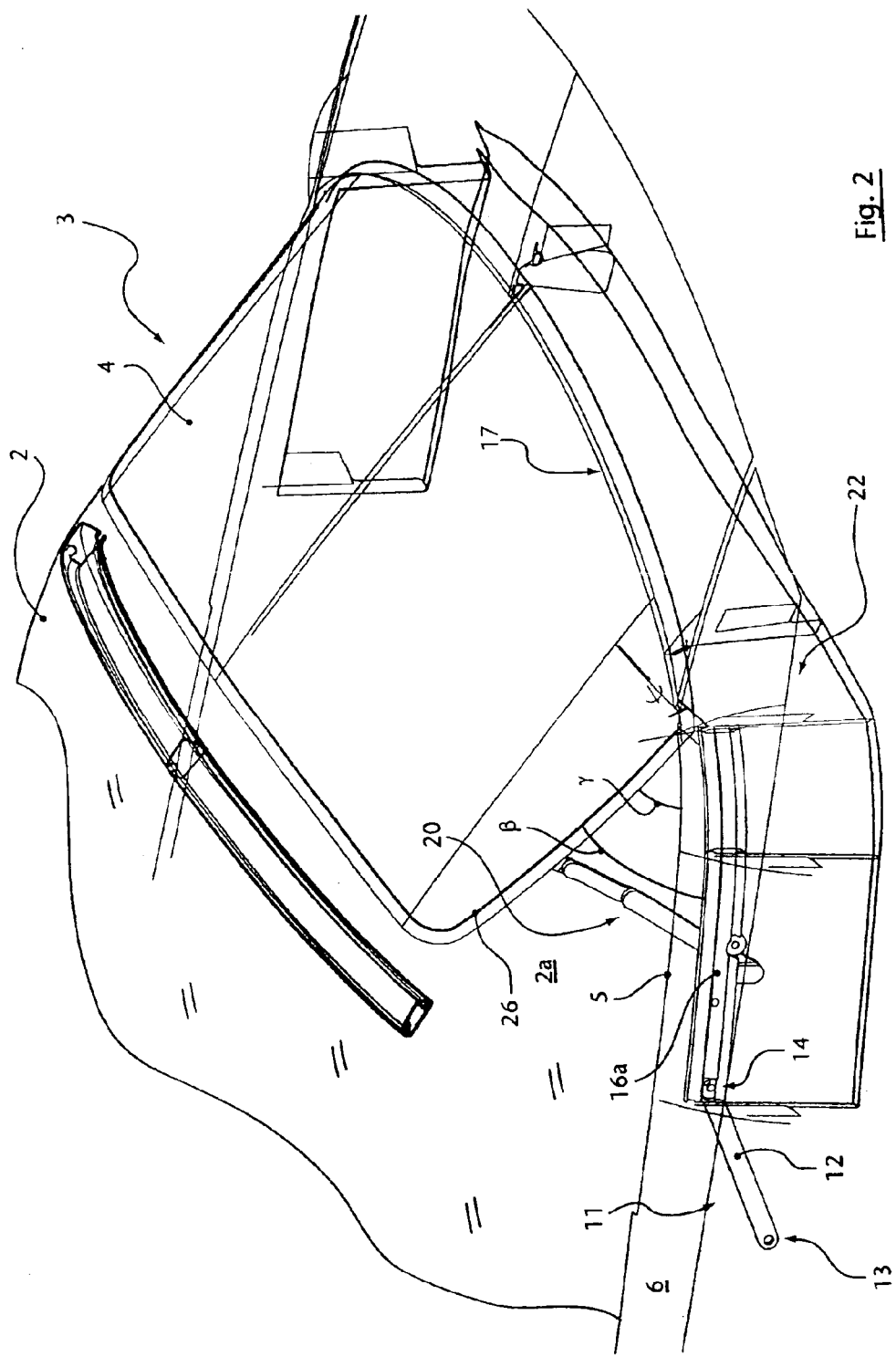
FIG. 2 shows a schematic representation in greater detail of section II shown in broken lines in FIG. 1, in which the roof cover is transparently represented in order to illustrate features and elements disposed underneath the roof cover.
Figure 5:
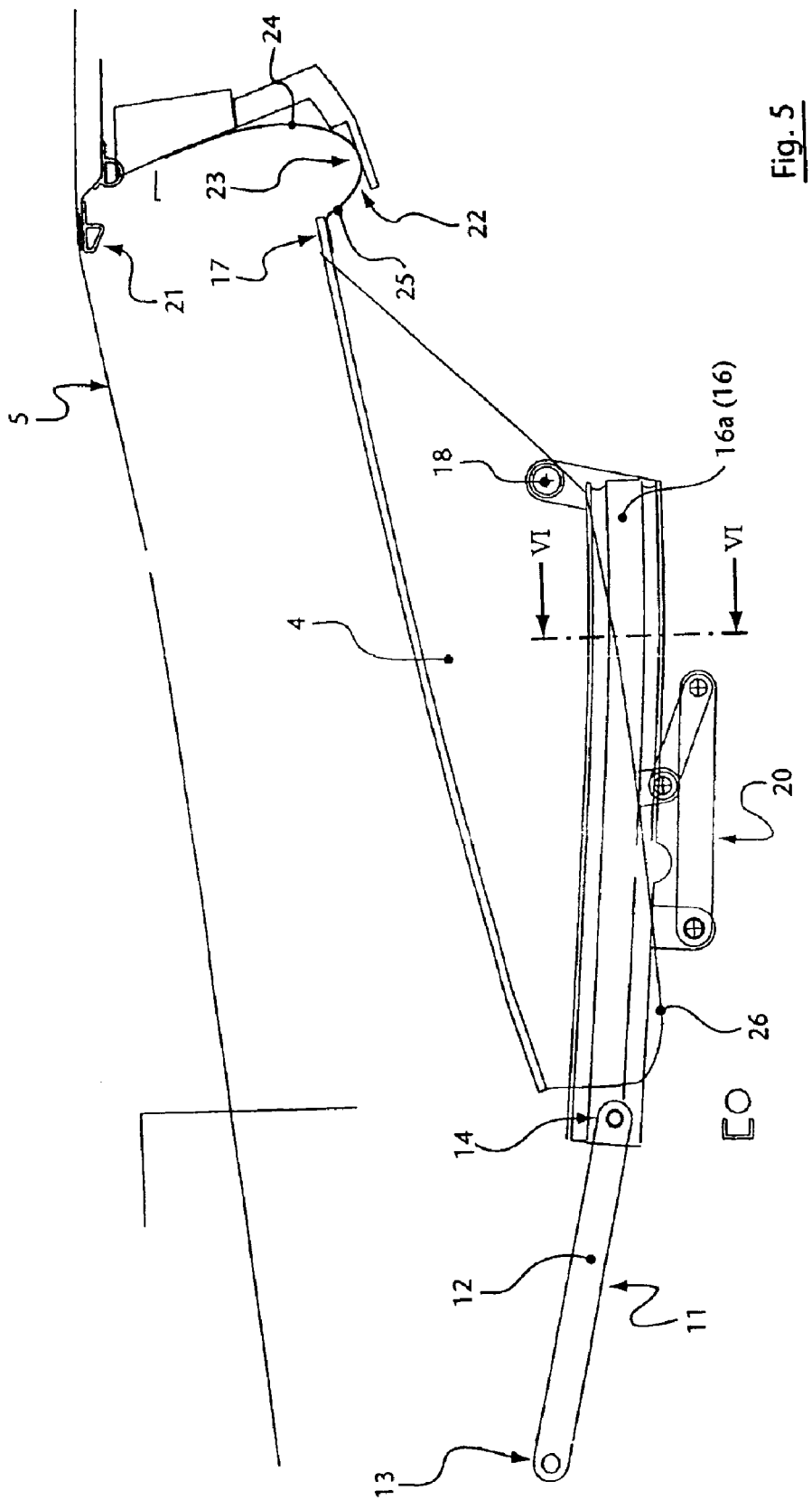
FIG. 5 shows a view similar to FIG. 4, in which the roof rear portion is stored within the vehicle body in the fully opened roof position.

The lower portion of the roof rear portion 3 preferably is movable between a closed position (FIGS. 1–3) and an open position (FIG. 5). As shown in FIGS. 2–5, at least one lateral hinge means 11 may movably (pivotably) couple the roof 2 to the vehicle body 6. The hinge means 11 may preferably include a guide rod 12 that generally extends substantially in parallel with the longitudinal axis of the vehicle 1. A first end 13 of the guide rod 12 preferably is coupled or pivotably hinged to the vehicle body 6. A second end 14 of the guide rod 12 preferably is pivotable about a movable, substantially horizontally-disposed axis 15 and is coupled to a rear tensioning bow portion 16a, as shown in FIG. 3. At least one tensioning bow portion 16a is preferably associated with each lateral side of the roof rear portion 3, and the tensioning bow portions 16a preferably impart a tension (stretching force) across the rear portion of the textile cover 2a when the roof 2 is closed. The two tensioning bow portions 16a will also be referred to collectively as tensioning bow 16 in this specification, although it should be understood that no tensioning bow or tensioning bow portion is required to be provided below the rear window 4 in the representative embodiments shown in the drawings.

With the roof 2 in the closed position, the tensioning bow 16 rests as a whole substantially horizontally within the lower portion of the roof rear portion 3. As noted above, the tensioning bow 16 is preferably split into two separate portions 16a. In this case, the tensioning bow 16 will not include a middle or central section disposed along the lower edge 17 of the rear window 4. Instead, the lower edge 17 may substantially define the lowermost disposed portion of the roof 2 within the middle section of the roof 2. Further, the vehicle middle longitudinal axis preferably falls within a gap or space defined between the tensioning bow portions 16a, and at least a portion of the lower edge 17 of the rear window 4 optionally may be disposed within the gap or space.

The lower edge 17 of the rear window 4 is preferably not covered by a fabric material or by any frame or profile parts. In this case, the view through the lowermost portion of the rear window 4 is substantially unobstructed all the way down to the window shoulder line 5 of the vehicle body 6. As shown in FIG. 3, when the roof 2 is closed, the lower edge 17 of the rear window 4 preferably is disposed below, and preferably contacts, a seal 21 provided on the vehicle body 6 substantially at (e.g., just below) the window shoulder line 5.

Figure 7:
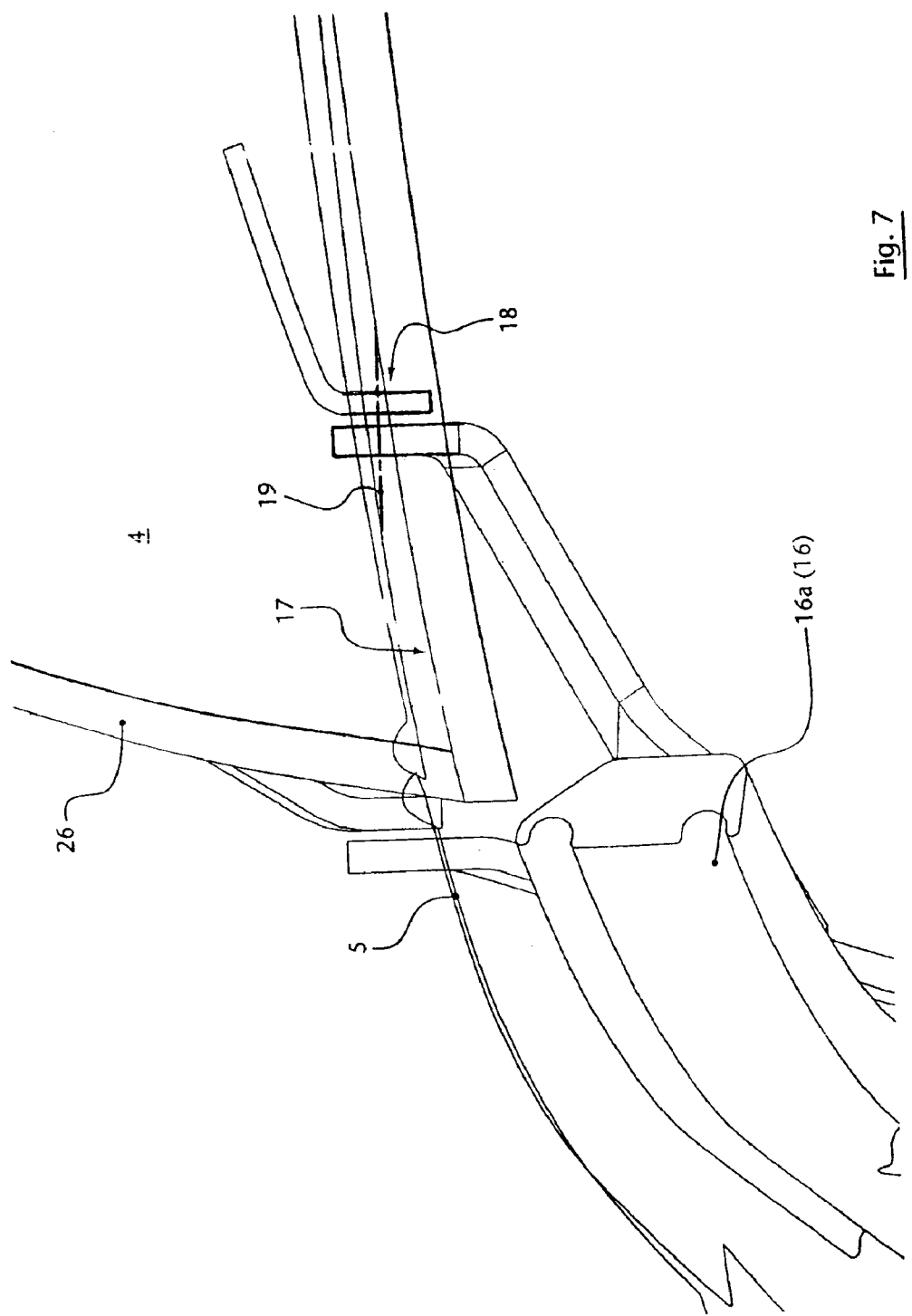
FIG. 7 shows a schematic view of the lower (in the direction of travel), left corner area of the rear window as seen from behind, generally along the direction of arrow VII shown in FIG. 1.

As shown in FIGS. 3–5, the rear window 4 may be coupled via a pivotable hinge 18 to the tensioning bow portion 16a. One pivotable hinge 18 preferably may be provided on each lateral side of the vehicle 1. The pivotable hinges 18 enable the rear window 4 to pivot about a horizontally-disposed axis 19 with respect to the tensioning bow 16, as shown in FIG. 7. As was noted above, the pivotable hinges 18 are preferably attached to the rear window 4, or a frame disposed around the rear window 4, substantially at a lowermost portion of the rear window 4 (or a frame partially or entirely surrounding the rear window 4).

When the roof 2 is closed, maximum opening angle $\beta$ is defined between the rear window 4 and the tensioning bow portions 16a, as shown in FIG. 3. This angle $\beta$ will decrease in a continuous or substantially linear manner when the roof 2 is opened.

The respective horizontally-disposed axes 19 of the hinges 18 preferably extend approximately at the same height as the lower edge 17 of the rear window 4. In this case, when the rear window 4 pivots towards the tensioning bow 16, thereby decreasing the angle β, a section of the textile cover 2a adjacent to the rear window 4 will fold into a triangular shape without resulting in any tension across that section of the textile cover 2a. Such a tension could possibly lead to a tear in the fabric material (textile cover 2a) that covers this portion of the roof 2. In the alternative, it may be necessary to incorporate an additional construction, such as a pocket or pouch, in order to provide further tolerance, although such an additional construction might be visually distracting and could result in additional manufacturing costs.

To ensure a suitable amount of tension on the textile triangle and a maximum upright position of the rear window 4 when the roof 2 is closed, an additional toggle joint means 20 optionally may be provided on each side of the vehicle 1. The combination of the toggle joint means 20 and the tension on the textile cover 2a enables the rear window 4 to be placed in a desired position. Further, the hinge means 11 causes the rear window 4 to be pressed or biased from below against the seal 21, thereby preventing water and/or other foreign substances from entering between the rear window 4 and the vehicle body 6 when the roof 2 is closed.

In the alternative, a coil spring (not shown) also could be disposed in the hinge 18, instead of utilizing the toggle joint means 20. In such an embodiment, the coil spring preferably should be designed to exert or apply an upwardly directed (substantially vertically oriented) torque on the rear window 4 when the roof 2 is being closed.

Figure 6:
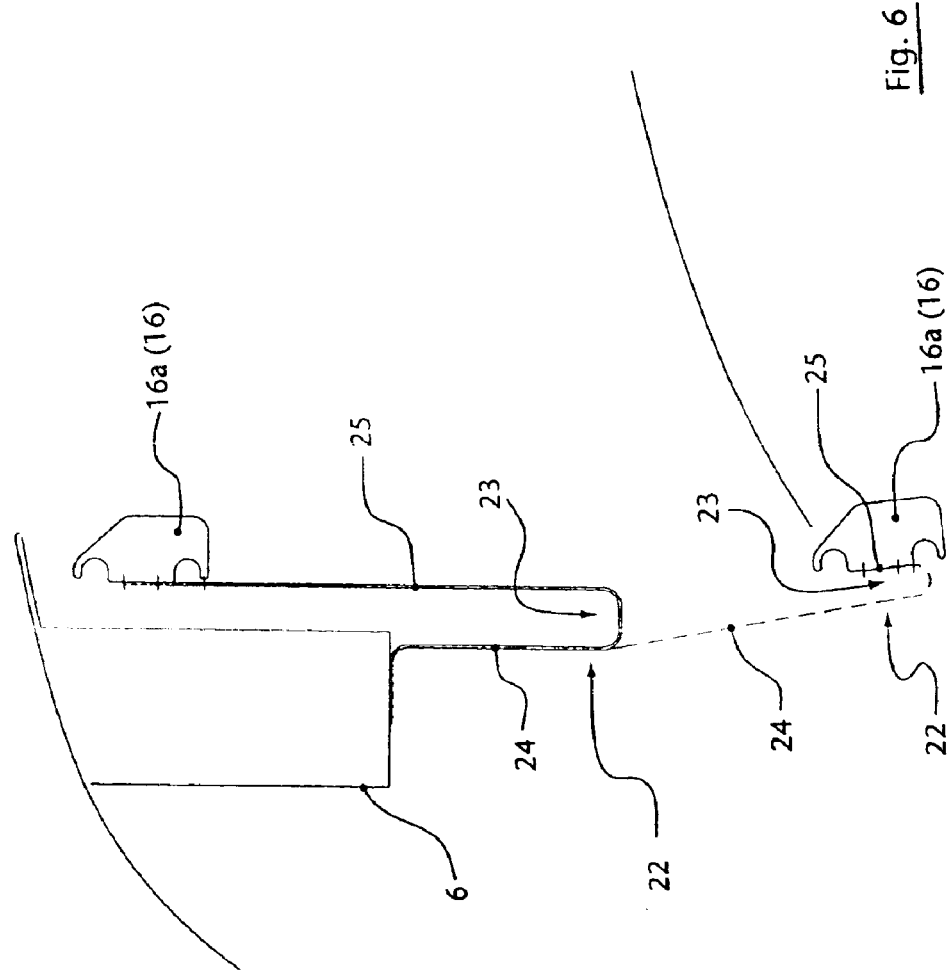
FIG. 6 shows a cross section of the flexible water channel in two different positions, the cross section being taken along broken lines VI—VI respectively shown in FIGS. 3 and 5.

The lower edge 17 of the rear window 4 preferably may be connected to a flexible water channel 22, e.g., by adhesive, reactive adhering, welding or other mechanical fastening means. In the representative example shown in the drawings, the water channel 22 extends in a substantially or generally U-shape below the lower portion of the rear roof portion 3, although this shape is not mandatory. More preferably, a first side of the water channel 22 may be directly coupled to the lower part of the rear window 4, as well as to each tensioning bow portion 16a, so as to cover or extend across the gap (space) between these elements and the vehicle body 6. A second side of the water channel 22 is preferably directly attached or coupled to the vehicle body 6, as shown in FIG. 6.

If the water channel 22 is flexible, the transition or space between the rear window 4 and the tensioning bow 16 can be flexibly bridged. Therefore, the water channel 22 provides great freedom in defining the size of the rear window 4 and the length of the tensioning bow portions 16a. For example, the size of the rear window 4 may be increased such that the rear window 4 extends, at least partially, around to the lateral sides (i.e., the driver and passenger door sides) of the vehicle 1. In other words, the leftmost and rightmost sides of the rear window 4 may be curved so as to conform to the outer shape of the roof 2 (e.g., corner portions of the roof 2), as shown in FIG. 2. As a result, the visible area defined by the rear window 4 can be significantly increased. In such case, the rear window 4 will include a central portion that lies substantially perpendicular to the longitudinal axis of the vehicle and will also include outer (lateral) portions that lie substantially in parallel with the longitudinal axis of the vehicle. For example, the rear window 4 may have an arched or arcuate shape when viewed in cross-section.

In the representative embodiment shown in FIG. 2, the rear window 4 provides a substantially panoramic rear view (i.e., a much larger view than average), not only towards the bottom of the rear window 4, but also towards the lateral sides of the vehicle 1. Moreover, the roof 2 can be easily and efficiently folded for storage within the vehicle body 6 when the roof 2 is opened. As viewed from a lateral position shown in FIG. 2, the lateral (side) edges 26 of the rear window 4 preferably may form an acute angle γ with the window shoulder line 5.

The water channel 22, which may be integrally formed (i.e., one-piece), is preferably designed as a flexible component made of a synthetic polymer material, e.g., polyvinyl chloride ("PVC"). More preferably, the water channel 22 may be constructed from a polyamide-based textile fabric that has been coated with polyurethane (TPU, PUR). Such a material is highly stretchable and can be welded, if desired. A representative material can be obtained from Beneke Kaliko under the product name "Benova 6129."

As viewed in cross section shown by FIG. 6, the water channel 22 preferably includes a trough (recess) 23, which may be defined on one side by the vehicle body 6 and a first wall 24 and on the other side by the respective tensioning bow portion 16a and a second wall 25. The trough 23 may be defined so as to collect (catch) any water and/or other foreign substances that fall between the rear window 4 and the vehicle body 6.

When the roof 2 is closed and the tensioning bow 16 and the rear window 4 are disposed at their maximum upward (uppermost) position (drawn as a continuous line in FIG. 6), the height ratio of the first wall 24 to the second wall 25 is preferably about 1:3.

When the roof 2 is opened and the tensioning bow 16 and the rear window 4 are moved or shifted to a maximum lower (lowermost) position (drawn as a broken line in FIG. 6), the corresponding height ratio is preferably about 5:1. These height ratios indicate that the material used for the water channel 22 is preferably highly flexible.

Further, the first and second walls 24 and 25 may be modified so as to provide larger length (height ratio) differences between the roof opened position and the roof closed position. In this case, the stroke length of the tensioning bow 16 and the rear window 4 to their storage portion within the vehicle body 6 can be considerable. If a relatively large interior must be spanned and the roof 2 folds down in approximately a Z shape, the rear window 4 will lie at the bottom of the roof storage compartment and will be covered by two additional roof parts that also preferably will be stored below the window shoulder line 5.

However, even in this case, the roof 2 can be reliably sealed against the vehicle body 6 with minimal weight and mechanical force or effort, so as to effectively prevent water and/or other foreign substances from entering into the vehicle body 6. In addition, the seal provides protection for a luggage compartment (trunk) that may be defined within the vehicle body 6. The luggage compartment may be provided, e.g., adjacent to the roof storage compartment.

Preferably, the free (terminal) ends of the U-shaped water channel 22 are designed so as to lead into one or more drainage tubes, vertical channels or similar device(s) (not shown) in order to effectively dispose of any water and/or other foreign substances that may collect in the water channel 22.

Naturally, the foldable roofs described herein may be manually opened and closed, or may be automatically driven, e.g., electronically and/or hydraulically.

What is claimed is:
1. A convertible vehicle comprising:
a vehicle body defining a window shoulder line along its upper edge, a foldable roof comprising a roof cover and a rear window supported within a rear roof portion, the foldable roof being pivotably coupled to the vehicle body so as to be movable between a roof open position and a roof closed position, wherein the rear window extends to, or below, the window shoulder line when the foldable convertible roof is disposed in the roof closed position, and at least two tensioning bow portions disposed substantially laterally with respect to the rear window and on opposite, lower sides of the foldable roof, wherein a space between the tensioning bow portions is defined proximal to a rear, lower edge of the foldable roof and the window shoulder line when the foldable roof is disposed in the roof closed position, a first end of each tensioning bow portion is pivotably coupled to the vehicle body and a second end of each tensioning bow portion is pivotably coupled to the rear window, and wherein the tensioning bow portions are arranged and constructed to apply a stretching force across a rear portion of the roof cover when the roof is disposed in the roof closed position.

2. A convertible vehicle as in claim 1, further comprising a flexible water channel arranged and constructed to provide a water barrier between the vehicle body and the foldable roof, the flexible water channel having a first and second side, the first side being coupled to, and extending along, the rear, lower edge of the foldable roof, and the second side being coupled to the vehicle body.

3. A convertible vehicle as in claim 2, wherein a lower portion of the rear window extends within the space defined between the tensioning bow portions when the roof is disposed in the roof closed position.

4. A convertible vehicle according to claim 3, wherein the flexible water channel extends substantially horizontally around the rear roof portion in a generally U-shape, the flexible water channel being attached to the respective tensioning bow portions on lateral sides of the vehicle body and being directly attached to a lower edge of the rear window in a longitudinally middle portion of the vehicle body.

5. A convertible vehicle according to claim 4, wherein the flexible water channel is a one-piece, continuous member.

6. A convertible vehicle according to claim 5, wherein the flexible water channel comprises a flexible synthetic material.

7. A convertible vehicle according to claim 6, wherein the flexible water channel comprises a polyamide layer coated with polyurethane.

8. A convertible vehicle according to claim 7, wherein the flexible water channel includes a trough that is defined between first and second opposing walls, the second wall being coupled to the tensioning bow portions and the rear window and the first wall being coupled to the vehicle body, wherein the water channel is arranged and constructed such that the position of the trough and a height ratio of the first wall to the second wall varies according to the opening state of the roof.

9. A convertible vehicle according to claim 8, wherein the water channel is arranged and constructed such that the height ratio between the first wall and the second wall is between about 5:1 and 1:5 when the roof is moved to the roof open position from the roof closed position.

10. A convertible vehicle according to claim 9, wherein the rear window is rigid and arched in cross-section and comprises curved lateral side portions that conform to corner portions of the rear roof portion.

11. A convertible vehicle, comprising:
a vehicle body defining a window shoulder line along its upper edge,
a foldable roof movably supported by the vehicle body and having a rigid, rear window disposed within a rear roof portion, the foldable roof being movable between a roof open position and a roof closed position, and the foldable roof being arranged and constructed to be stored within the vehicle body and below the window shoulder line when the foldable roof is disposed in the roof open position, and
at least first and second tensioning bow portions extending substantially laterally with respect to the rear window and substantially in parallel with a central longitudinal axis of the vehicle, wherein a first end of each tensioning bow portion is pivotably coupled to the vehicle body, a second end of each tensioning bow portion is pivotably coupled to the rear window, a gap is defined between the tensioning bow portions proximal to a lower edge of the rear window and the tensioning bow portions are arranged and constructed to apply a stretching force across a rear portion of a roof cover when the roof is disposed in the roof closed position.

12. A convertible vehicle as in claim 11, further comprising a flexible water channel movably coupling the foldable roof to the vehicle body.

13. A convertible vehicle as in claim 12, wherein the flexible water channel comprises first and second walls defining a trough therebetween, the first wall being coupled to the vehicle body, an inner portion of the second wall being attached to a lower edge of the rear window and outer portions of the second wall being respectively attached to the first and second tensioning bow portions.

14. A convertible vehicle according to claim 13, wherein the water channel is an integrally formed member having a substantially U-shape in horizontal cross-section.

15. A convertible vehicle according to claim 14, wherein the water channel comprises a stretchable polyamide layer.

16. A convertible vehicle according to claim 15, wherein a height ratio of the first wall to the second wall varies between about 5:1 and 1:5 according to the opening state of the roof.

17. A convertible vehicle according to claim 16, wherein the rear window comprises curved lateral side portions so as to conform to corner portions of the rear roof portion.

18. A convertible vehicle according to claim 17, further comprising a seal disposed on the vehicle body proximal to the window shoulder line, wherein the foldable roof is arranged and constructed such that a lower portion of the rear window contacts the seal when the roof is disposed in the roof closed position and the lower portion of the rear window separates from the seal when the roof is moved to the roof open position.

19. A convertible vehicle according to claim 18, wherein the rear window provides a substantially panoramic rear view that is substantially unobstructed down to the window shoulder line when the roof is disposed in the roof closed position.

20. A convertible vehicle according to claim 13, wherein a height ratio of the first wall to the second wall varies between about 5:1 and 1:5 according to the opening state of the roof.

21. An apparatus comprising:
a foldable roof having a roof cover and a rear window disposed within a rear roof portion of the roof cover,
first and second tensioning bow portions arranged and constructed to apply a stretching force across lower, rear, side portions of the roof cover when the roof is disposed in a roof closed position, a first end of each tensioning bow portion being pivotably coupled to the rear window and a second end of each tensioning bow portion being arranged and constructed to be pivotably attached to a convertible vehicle body, and a flexible water channel having a first wall, a second wall and a trough defined between the first and second walls, wherein the first wall is arranged and constructed to be attached to the convertible vehicle body, and wherein a central portion of the second wall is coupled to the rear window and outer portions of the second wall are respectively coupled to the first and second tensioning bow portions.

22. An apparatus according to claim 21, wherein a space between the tensioning bow portions is defined proximal to a lower, rear edge of the foldable roof and at least a portion of the rear window is disposed within the space when the roof is disposed in the roof closed position.

23. An apparatus according to claim 22, wherein the rear window comprises curved lateral side portions that conform to corner portions of the rear roof portion.

24. A convertible vehicle comprising:

a convertible vehicle body defining a window shoulder line, the apparatus of claim 23, wherein the second end of each tensioning bow portion is pivotably attached to the convertible vehicle body and the first wall of the flexible water channel is coupled to the convertible vehicle body, and a seal disposed on the convertible vehicle body proximal to the window shoulder line, wherein the foldable roof is arranged and constructed such that a lower portion of the rear window contacts the seal when the roof is disposed in the roof closed position and the lower portion of the rear window separates from the seal when the roof is moved to a roof open position.

25. A convertible vehicle according to claim 24, wherein the rear window is substantially rigid and wherein the foldable roof and the convertible vehicle body are arranged and constructed to store the rear window within the convertible vehicle body when the roof is disposed in the roof open position.

26. An apparatus comprising:

a foldable roof comprising a roof cover and a rear window supported within a rear roof portion, the foldable roof being arranged and constructed to be pivotably coupled to a vehicle body so as to be movable between a roof open position and a roof closed position, and first and second tensioning bow portions pivotably connected to opposite lateral sides of the rear window and respectively extending proximal to a lower edge of side portions of the foldable roof, wherein no tensioning bow is provided within a lower, rear section of the foldable roof defined by first and second vertically extending edges of the rear window such that a space between the first and second tensioning bow portions is defined within the lower, rear section of the foldable roof, and wherein the first and second tensioning bow portions are arranged and constructed to apply a stretching force across a rear portion of the roof cover when the foldable roof is disposed in the roof closed position.

27. An apparatus according to claim 26, wherein at least a portion of the rear window is disposed within the space defined between the first and second tensioning bow portions when the roof is disposed in the roof closed position.

28. An apparatus according to claim 27, wherein the rear window is substantially rigid and comprises curved lateral side portions that conform to corner portions of the rear roof portion.

29. An apparatus according to claim 28, wherein the first tensioning bow portion is pivotably coupled to a lowermost portion of the first vertically extending edge of the rear window and the second tensioning bow portion is pivotably coupled to a lowermost portion of the second vertically extending edge of the rear window.

30. An apparatus according to claim 29, further comprising a flexible water channel coupled to a lower edge of the foldable roof and being arranged and constructed to be attached to the vehicle body.

31. An apparatus according to claim 30, wherein the flexible water channel is substantially U-shaped in horizontal cross-section and is also attached to the first and second tensioning bow portions.

32. An apparatus according to claim 31, wherein the rear window is arranged and constructed so that, when the foldable roof is disposed in the roof closed position, the rear window extends to, or below, a window shoulder line defined by the vehicle body.

* * * * *